United States Patent [19]

Kondo

[11] Patent Number: 5,288,975
[45] Date of Patent: Feb. 22, 1994

[54] RESISTANCE ADJUSTING TYPE HEATER

[75] Inventor: Tomoharu Kondo, Toki, Japan

[73] Assignee: NGK Insulators, Ltd., Japan

[21] Appl. No.: 28,634

[22] Filed: Mar. 8, 1993

Related U.S. Application Data

[63] Continuation of Ser. No. 824,085, Jan. 22, 1992, abandoned.

[30] Foreign Application Priority Data

Jan. 30, 1991 [JP] Japan ................... 3-029393

[51] Int. Cl.⁵ .................. H05B 3/10; F01N 3/10
[52] U.S. Cl. .................. 219/552; 392/485; 392/488; 422/174
[58] Field of Search ........... 392/502, 347, 379, 485, 392/486, 488, 490; 219/542, 541, 552, 553; 422/174, 175, 177, 179, 180; 502/527, 439; 60/300; 423/212 C, 239; 428/116

[56] References Cited

U.S. PATENT DOCUMENTS

| | | | |
|---|---|---|---|
| 3,956,614 | 5/1976 | Hervert | 219/541 |
| 3,982,100 | 9/1976 | Hervert | 219/553 |
| 4,717,813 | 1/1988 | Berg et al. | 219/541 |
| 5,063,029 | 11/1991 | Mizuno et al. | 422/175 |

FOREIGN PATENT DOCUMENTS

| | | |
|---|---|---|
| 0194507A1 | 9/1986 | European Pat. Off. . |
| 58-23138 | 5/1983 | Japan . |
| 63-67609 | 5/1988 | Japan . |
| 1492929 | 11/1977 | United Kingdom . |
| 2049377A | 12/1980 | United Kingdom . |
| WO89/10471 | 11/1989 | World Int. Prop. O. . |

OTHER PUBLICATIONS

Patent Abstracts of Japan, vol. 8, No. 227 (M-332) Oct. 18, 1984 & JP-A-59 109 704 (Toshiba) Jun. 25, 1984.

*Primary Examiner*—Bruce A. Reynolds
*Assistant Examiner*—Michael D. Switzer
*Attorney, Agent, or Firm*—Parkhurst, Wendel & Rossi

[57] ABSTRACT

A resistance-adjusting-type heater including a honeycomb structure having a large number of passages and at least two electrodes provided on the honeycomb structure for energizing the honeycomb structure. The honeycomb structure has a slit or slits which form a predetermined angle to the partition walls of the honeycomb structure so as to enable adjustment of resistance between the electrodes, so that gas flowing through the passages of the honeycomb structure is heated.

4 Claims, 3 Drawing Sheets

RESISTANCE ADJUSTING TYPE HEATER

This is a continuation of application Ser. No. 07/824,085 filed Jan. 22, 1992, now abandoned.

BACKGROUND OF THE INVENTION

1. Field of the Invention

The present invention relates to a heater honeycomb having resistance adjusting means.

Honeycomb heaters of the above-described type can be employed as heaters for domestic use, such as hot-air heaters, or as industrial heaters, such as preheaters used for control of automobile exhaust emissions.

2. Description of the Prior Art

Recently, besides conventional porous ceramic honeycomb structures, metal honeycomb structures have drawn attention as catalysts or catalyst carriers for removing nitrogen oxide, carbon monoxide and hydrocarbons present in the exhaust gas from internal combustion engines, such as those in automobiles.

As restriction of exhaust emissions has increased, there has been a demand for development of heaters for use in reducing automobile exhaust emissions when the temperature of the catalyst is not sufficiently high, i.e., at the beginning of running of a vehicle.

Honeycomb structures have been proposed in, for example, U.K. Patent 1492929 and Japanese Utility Model Laid-Open No. 67609/1988.

U.K. Patent 1492929 discloses a foil-type metal honeycomb structure in a catalyst for control of automobile exhaust emissions. This honeycomb structure comprises a metal substrate produced by winding a flat plate and a mechanically deformed, corrugated plate together. This metal substrate has an aluminum oxide film formed on the surface thereof by oxidation. The catalyst for use in automobile exhaust emission control is manufactured by placing a large surface area oxide, such as alumina, on the aluminum oxide film of the metal substrate and by impregnating a noble metal on the large surface area oxide.

Japanese Utility Model Laid-Open No. 67609/1988 discloses an electrically conductive metal monolith preheater including a metal support and alumina coated thereon.

In the foil-type metal honeycomb structure disclosed in U.K. Patent 1492929, however, the metal substrate with a coating formed thereon does not closely adhere to a catalyst layer because of low porosity of the metal substrate, and a ceramic catalyst readily peels from the metal substrate due to a difference in the thermal expansion between the ceramic catalyst and the metal substrate. Furthermore, telescope phenomenon readily occurs during the run cycle in which a metal-to-metal join breaks and the metal substrate is deformed in such a manner that it protrudes in the direction of the flow of gas. This may disturb safe running of the vehicle. Furthermore, in the manufacture of the foil-type metal honeycomb, yield of the rolling process is low, inviting high production cost. In the preheater proposed in Japanese Utility Model Laid-Open No. 67609/1988, a catalyst readily peels from due to a difference in thermal expansion between alumina and the metal support. Furthermore, a metal-to-metal join of the metal substrate breaks during the operation, generating an electrically insulating portion and, hence, non-uniform flow of current and non-uniform heating.

The preheater disclosed in Japanese Utility Model Laid-Open Open No. 67609/1988 is constructed so that a current is supplied between the inner periphery and the outer periphery of the foil-type metal honeycomb structure to generate heat. However, the preheater is not arranged so that it has an adjusted resistance (i.e., the material, dimension and rib thickness of the honeycomb structure are fixed and resistance cannot be adjusted to that desired), and therefore, exhibits insufficient temperature raising characteristics. Furthermore, since the electrodes are provided on the inner peripheral portion of the preheater, the central portion thereof does not act as a catalyst and pressure loss may be generated. Furthermore, the electrodes readily from the heater due to the flow of gas.

SUMMARY OF THE INVENTION

Accordingly, an object of the present invention is to provide a resistance adjusting type heater and catalytic converter which eliminate the aforementioned problems of the prior devices.

According to the present invention, there is provided a resistance-adjusting-type heater comprising a honeycomb structure having a large number of passages and at least two electrodes provided on the honeycomb structure for energizing the honeycomb structure. The honeycomb structure has slits which form a predetermined angle to the partition walls of the honeycomb structure so as to enable adjustment of resistance between the electrodes, so that the gas flowing through the passages of the honeycomb structure is heated.

The invention also provides a resistance-adjusting-type heater which catalytically purifies exhaust gas, comprising a catalyst loaded on the honeycomb structure.

Preferably, the catalyst structure is obtained by sintering a powder material into a honeycomb form.

DETAILED DESCRIPTION OF THE INVENTION

The present invention provides a resistance-adjusting-type heater comprising a honeycomb structure with a large number of passages, and electrodes provided on the honeycomb structure. The honeycomb structure has slits which form a predetermined angle to the partition walls of honeycomb structure so as to enable the adjustment of resistance between the electrodes. It is possible to control heat generation by adjusting the resistance with the slits, and to effect a local or overall temperature raising characteristics as desired according to its uses.

Preferably, the above-mentioned honeycomb structure is produced by forming a powder material into a honeycomb configuration and by sintering the shaped body. In this case, the honeycomb structure is preferably formed by a metallurgical process and extrusion.

These methods are simple and can reduce the production cost.

The heater is preferably formed as an internal honeycomb structure from a powder material so that uniform heat generation is attained without suffering from telescope phenomenon.

It is generally expected that each cell of the honeycomb structure has a substantially square form and slits as the resistance-adjusting means are directed in the same direction as the partition walls defining the cells. In such an arrangement, however, the electrical current flowing between the electrodes does not flow through all the ribs (partition walls) so that some of the partition walls do not generate heat. Thus, the heat generation from the whole heater is insufficient.

The present invention overcomes the above-described problem by not forming the slits in the same direction as the partition walls, but rather at a predetermined angle to the partition walls of the honeycomb structure. According to this arrangement of the invention, all the ribs (partition walls) between the electrodes are supplied with electric current so that the heat-generating area is increased and hence, the heat-exchanging area is increased.

Figure 1:
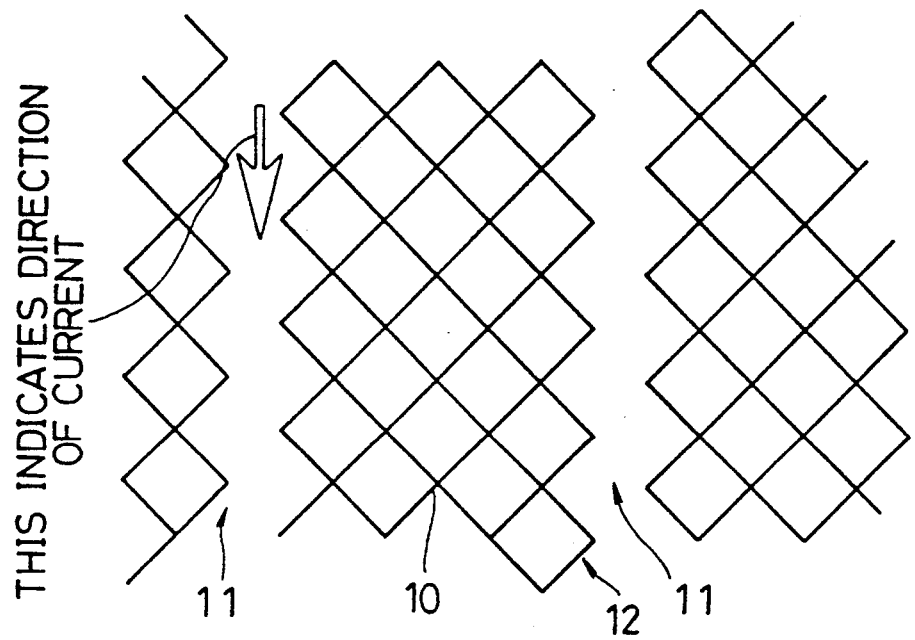
FIG. 1 is an illustration of a square cell structure between adjacent slits in a heater of the present invention.
Figure 2:
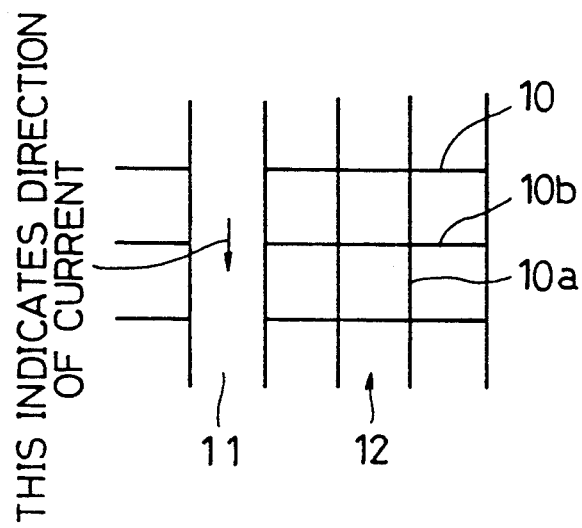
FIG. 2 is an illustration of a cell structure in which the partition walls 10a extend in parallel with the direction of flow of the electric current.

By forming slits 11 so as to make a predetermined angle to partition walls 10 of the honeycomb structure, the square cell structure 12 is arranged such that all the partition walls 10 form a predetermined angle to the direction of flow of the electric current, as shown in FIG. 1. In contrast, in the heater in which slits 11 extend in the same direction as the partition walls 10, only half of the partition walls 10, partition walls 10a, extend in the same direction as the electric current, as shown in FIG. 2. In contrast, the number of the ribs (partition walls) through which the electric current flows is greater in the cell structure shown in FIG. 1 than in the cell structure shown in FIG. 2. As a consequence, the resistance is increased to provide a greater rate of heat generation.

In the resistance-adjusting-type heater of the present invention, a coating of a heat-resistant metal oxide, such as $Al_2O_3$ or $Cr_2O_3$, on the surface of the partition walls and that of the pores of a metal honeycomb structure is preferred to enhance resistance to heat, oxidation and corrosion.

Whereas any material, ceramic or metal, capable of generating heat when energized can be used as the material of the honeycomb structure which is the basic body of the present invention, metals have higher mechanical strength. Examples of such metals include stainless steel and those having compositions of Fe-Cr-Al, Fe-Cr, Fe-Al, Fe-Ni, W-Co, and Ni-Cr. Among the above materials, Fe-Cr-Al, Fe-Cr and Fe-Al are preferred because of their low cost and high resistance to heat, oxidation and corrosion. Foil-type metal honeycomb structures may also be employed.

The honeycomb structure employed in the present invention may be porous or may not be porous. In the case where a catalyst is carried on the honeycomb structure, however, a porous honeycomb structure is preferred because it closely adheres to a catalyst layer whereby the catalyst layer does not peel due to a difference in the thermal expansion between the honeycomb structure and the catalyst. Even if a non-porous honeycomb structure is employed, since the heater of this invention has a slit as resistance-adjusting means, thermal stress can be reduced and the possibility of crack occurrence can be decreased.

The method of manufacturing the metal honeycomb structure which can be employed in the present invention will now be exemplified.

First, Fe powder, Al powder and Cr powder, or alternatively powder of alloys of these metals, are mixed to prepare a metal powder material having a desired composition. Subsequently, the metal powder material is blended with an organic binder, such as methyl cellulose or polyvinylalcohol, and water to produce a readily formable mixture, and that mixture is then formed into a shape of a desired honeycomb configuration by extrusion.

When the metal powder material is blended with an organic binder and water, prior to the addition of water, an antioxidant, such as oleic acid, may be added to the metal powder material. Alternatively, metal powder which has been subjected to an anti-oxidation process may be employed.

Next, the shaped honeycomb body is fired in a non-oxidizing atmosphere at a temperature between 1000° and 1400° C. During firing in the non-oxidizing atmosphere containing hydrogen, the organic binder is decomposed and thereby removed with the aid of Fe or the like which acts as a catalyst, and a good sintered body can therefore be obtained.

A body fired at a temperature lower than 1000° C. is not adequately sintered. Sintering conducted at a temperature higher than 1400° C. causes deformation of the resulting sintered body.

Preferably, a heat-resistant metal oxide is then coated on the surface of the partition walls and that of the pores of the obtained sintered body by any of the following methods.

(1) The metal honeycomb structure (the sintered body) is subjected to heat-treatment in an oxidizing atmosphere at a temperature between 700° to 1100° C.

(2) Al or the like is plated (e.g., vapor plating) on the surface of the partition walls and that of the pores of the sintered body and that sintered body is then subjected to heat-treatment in an oxidizing atmosphere at a temperature between 700° and 1100° C.

(3) The sintered body is dipped into a molten metal, such as Al, and is then subjected to heat-treatment in an oxidizing atmosphere at a temperature between 700° and 1100° C.

(4) alumina sol or the like is coated on the surface of the partition walls and that of the pores of the sintered body and that sintered body is then subjected to heat-treatment in an oxidizing atmosphere at a temperature between 700° and 1100° C.

To enhance resistance to heat and oxidation, heat-treatment conducted at a temperature between 900° and 1100° C. is preferred.

Next, on the obtained honeycomb structure, slits are provided in various forms between the electrodes thereof, which will be described later. Providing slits may be conducted immediately after drying or forming as well as after firing as stated above.

The resistance-adjusting-type heater of the present invention is produced by providing electrodes on the outer periphery or inside of the metal honeycomb structure obtained in the manner described above by means of brazing or welding.

The resistance of the metal honeycomb structure will be preferably held between $0.001\Omega$ and $0.5\Omega$.

Also, a heater or catalytic converter can be produced by placing a catalyst on the surface of the obtained metal honeycomb structure. In such heater or catalytic converter, heat is generated due to reaction (oxidation) of the exhaust gas.

The catalyst supported on the surface of the metal honeycomb structure is made of a carrier having a large surface area and a catalytic-activating material supported on the carrier. Typical examples of the carriers having a large surface area include the types of $Al_2O_3$, $TiO_2$, $SiO_2$-$Al_2O_3$ and perovskite. Examples of the catalytic-activating material include noble metals, such as Pt, Pd and Rh, and base metals, such as Cu, Ni, Cr and Co. The preferred catalyst is the one in which from 10 to 100 $g/ft^3$ noble metal is loaded on the carrier made of $\gamma$-$Al_2O_3$.

Whereas the honeycomb structure employed in the present invention may have any configuration, it is desirable that the cell density ranges from 6 to 1500 cells/in$^2$ (0.9 to 233 cells/cm$^2$) with a wall thickness ranging from 50 to 2000 $\mu$m.

As stated above, the honeycomb structure employed in the present invention may be porous having any porosity, or may not be porous. However, to achieve sufficient mechanical strength and resistance to oxidation and corrosion, the porosity of the metal honeycomb structure will preferably be held between 0 and 50% by volume with most preferably porosity being less than 25% by volume. In the case of a honeycomb structure designed to carry a catalyst thereon, the porosity will be held 5% or above to ensure strong adhesion between the honeycomb structure and the catalyst layers.

The term, "honeycomb structure" is employed in this application to refer to an integral body having a large number of passages partitioned by walls. The outer shape of the honeycomb structure may be rectangular or elliptical as well as cylindrical. The passages may have any cross-sectional form (cell shape), e.g., a circular, polygonal or corrugated form.

The present invention will further be explained in the following examples which are intended to be illustrative, but not limiting, of this invention.

EXAMPLE 1

Production of Sample A

Figure 3:
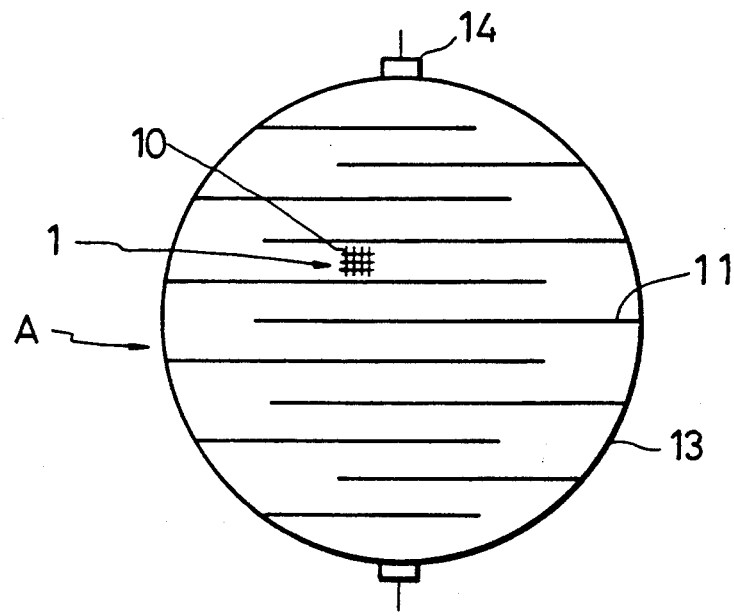
FIG. 3 is a perspective view of a heater catalyst A.

Fe powder, Fe-Cr powder and Fe-Al powder were mixed to form a composition expressed by Fe-20Cr-5Al(% by weight). An organic binder (methyl cellulose), an anti-oxidation agent (oleic acid) and water were added to this composition to form slurry. The slurry was extruded and dried so that a dried honeycomb body shown in FIG. 3 was obtained. The outer diameter and the thickness of the thus formed honeycomb body were 110 mm and 30 mm, respectively. The honeycomb structure had a multiplicity of square cells arranged at a density of 300 cells per square inch and a rib thickness of 8 mil. Eleven slits 11 were formed in the honeycomb body such that six cells are included in the region between adjacent slits and such that the slits extend in the same direction as partition walls 10a, half of the partition walls 10.

Subsequently, the honeycomb body was fired in an $H_2$ gas atmosphere, whereby a honeycomb structure 13 was obtained to have an outer diameter of 92 mm and a thickness of 25 mm.

The honeycomb structure 13 was coated with $\gamma$-$Al_2O_3$ and precious metals Pt and Pd were loaded in amounts of 30 $g/ft^3$ and 6 $g/ft^3$, respectively. The honeycomb structure was then fired at 600° C., whereby a honeycomb structure carrying catalyst was obtained.

Then, a pair of electrodes 14 were set in the outer wall of the thus-obtained honeycomb structure, whereby a heater catalyst A was obtained.

Production of Sample B

Figure 4:
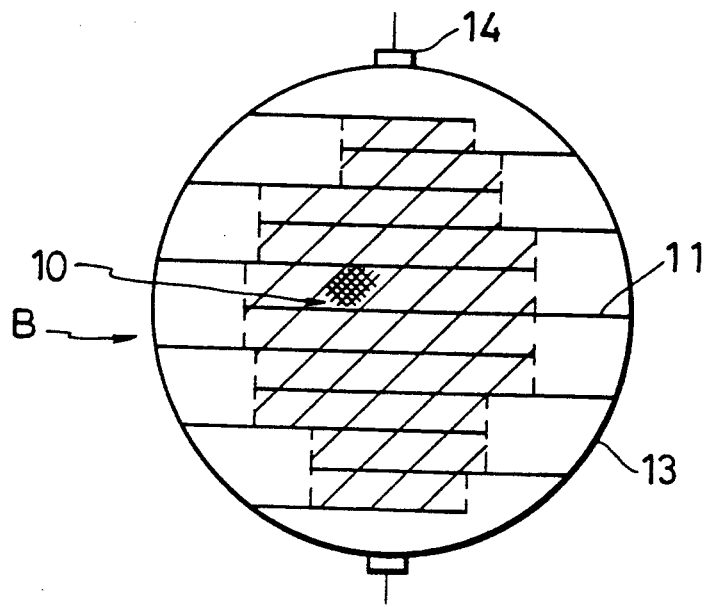
FIG. 4 is a perspective view of a heater catalyst B.

A honeycomb body of the same shape as that in Sample A was prepared from the same materials and through the same extrusion and drying process as in Sample A. Then, a honeycomb structure having the same number of slits 11 as Sample A was obtained. The length and pitch of the slits also were the same as those in Sample A. In this case, however, the slits were directed to form 45° to the partition walls 10 of the cell, as shown in FIG. 4.

The same process as that for the production of Sample A was applied to the above-mentioned honeycomb structure 13, whereby a heater catalyst B was obtained to have the same shape and heat-generating area as Sample A. Thus, catalyst heater B was the same as the catalyst heater A except the angle of the slits to the partition walls of the cell.

Before evaluating these heater catalysts A and B, electrical resistance of the heater catalysts A and B were measured. Both the heater catalysts A and B showed the same level of resistance of 0.04 $\Omega$. The effective volumes of the catalyst of both samples were 133 cm$^3$ and, hence these heater catalysts have the same performance on electric power when energizing and the same geometric surface area.

EVALUATION

Figure 5:
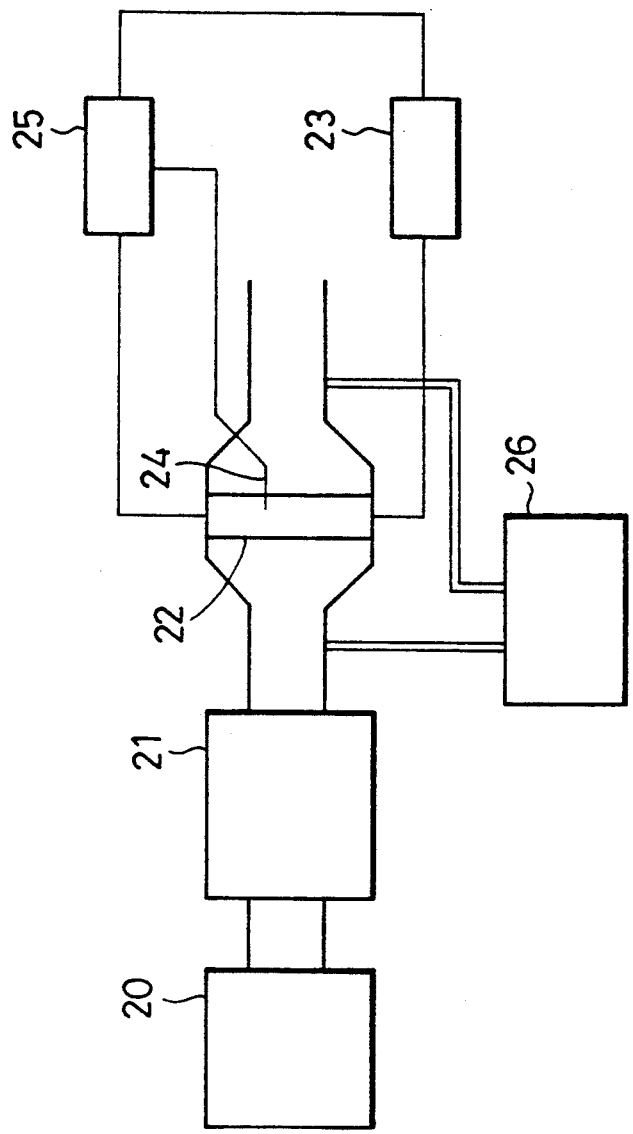
FIG. 5 is an illustration of an apparatus used for evaluation of performance of the heater catalyst.

The evaluation of performance of the heater catalysts were conducted by using an apparatus shown in FIG. 5.

More specifically, the exhaust gas from gasoline engine 20 is cooled down to 120° C. through a cooler 21 and then introduced into the heater catalyst 22. Electric power was supplied to the heater catalyst 22 from a 24 V battery 23 simultaneously with the commencement of evaluation, and the power supply was continued for 60 seconds with an on-off control by a controller 25 such that the temperature of the heater catalyst as measured by a thermocouple 24 is maintained at 350° C. The average cleaning rates for HC, CO and $NO_x$ during the period of 60 seconds were measured by an exhaust-gas-measuring device 26. The values of the average cleaning rates as measured on heater catalysts A and B are shown in Table 1.

TABLE 1

| | Average Cleaning Rate (%) | | |
|---|---|---|---|
| | HC | CO | $NO_x$ |
| Heater catalyst A | 34 | 52 | 58 |
| Heater catalyst B | 40 | 62 | 66 |

As has been described, according to the present invention, it is possible to obtain a highly durable resistance-adjusting-type heater which has superior temperature raising characteristics and which exhibits even heating while enabling control of heat generation.

What is claimed is:

1. A honeycomb heater comprising:
   a honeycomb structure having a periphery and two ends, including a plurality of passages which are defined by partition walls and extend in an axial direction between the ends;
   at least two electrodes in electrical contact with said honeycomb structure; and means for providing uniform heat generation from the partition walls, said means comprising at least one slit passing through the partition walls and forming a predetermined angle $\theta$ with respect to the partition walls as viewed in a cross-section of said honeycomb structure taken perpendicular to said axial direction, wherein $\theta$ is about 45°.

2. The honeycomb heater of claim 1, wherein said at least one slit extends parallel to said axial direction.

3. The honeycomb heater of claim 1, further comprising a catalyst formed on said partition walls of said honeycomb structure.

4. The honeycomb heater of claim 1, wherein said honeycomb structure is an integral body formed by sintering a shaped body comprising a powder material.

* * * * *